United States Patent [19]
Uhl et al.

[11] 3,867,172
[45] Feb. 18, 1975

[54] PRODUCTION OF FLAT MATERIALS PRINTED WITH PIGMENTS

[75] Inventors: Guenter Uhl, Worms; Karl Dachs; Herbert Helfert, both of Frankenthal; Rolf Fikentscher, Ludwigshafen, all of Germany

[73] Assignee: Badische Anilin- & Soda-Fabrik Aktiengesellschaft, Ludwigshafen/Rhine, Germany

[22] Filed: May 29, 1973

[21] Appl. No.: 364,942

[30] Foreign Application Priority Data
June 2, 1972 Germany.......................... 2226938

[52] U.S. Cl............................ 117/38, 8/62, 8/92, 106/308, 106/309, 117/161 UC, 260/37
[51] Int. Cl............................................ C09d 7/08
[58] Field of Search............ 117/15, 28, 38, 139.5 R, 117/161 UC; 8/62, 92; 106/308 F, 309; 260/37 P, 40 P

[56] References Cited
UNITED STATES PATENTS

| | | | |
|---|---|---|---|
| 2,933,416 | 4/1960 | Haakh et al. ...................... | 8/62 X |
| 3,444,157 | 4/1969 | Tanaka et al. ...................... | 8/92 X |
| 3,546,150 | 12/1970 | White et al. ...................... | 260/28.5 |
| 3,649,321 | 3/1972 | Durrant et al. ..................... | 106/300 |
| 3,694,239 | 9/1972 | Simon................................ | 106/309 |

FOREIGN PATENTS OR APPLICATIONS
1,245,898 8/1967 Germany

OTHER PUBLICATIONS

Ellis, Printing Inks, Reinhold Pub. Co., N.Y., 1940, p. 342.

Primary Examiner—Thomas J. Herbert, Jr.
Assistant Examiner—Bruce H. Hess
Attorney, Agent, or Firm—Johnston, Keil, Thompson & Shurtleff

[57] ABSTRACT

Production of flat materials such as textiles, paper, leather and plastics printed bright and deep shades with pigments with substantial or complete exclusion of mineral spirit in the presence of small amounts of specific aliphatic esters.

7 Claims, No Drawings

PRODUCTION OF FLAT MATERIALS PRINTED WITH PIGMENTS

This invention relates to a method of printing which dispenses with the use of mineral spirit.

DAS No. 1,245,898 discloses the advantageous use in textile printing with dyes having affinity for the fiber of low foam, leveling wetting agents which contain inter alia esters of branched higher aliphatic carboxylic acids and branched or linear higher aliphatic alcohols. Advantageous use of these or similar esters in pigment printing is not obvious because the use of wetting agents in pigment printing results in the dye penetrating deeply into the woven or knitted fabric with consequent decrease in dye yield and brightness.

Conventional pigment print pastes are usually composed on the principle of an oil-in-water emulsion. The presence of low volatility mineral spirit in such print pastes ensures particularly bright and deep shades. The proportion of mineral spirit in these print pastes usually amounts to from 50 to 70 percent by weight. This passes into the atmosphere and waste water, which from an environment point of view is no longer acceptable.

Printing without mineral spirit gives prints which have little brightness and poor color strength. The present invention has for its object the provision of a process which gives bright and deep shades while substantially or completely dispensing with the use of mineral spirit and thus protecting the environment.

This object is achieved by a process for the production of printed flat materials by printing thereon a print paste consisting essentially of at least one pigment, binder, thickener and water which is characterized by the fact that a print paste is used which contains from 1 to 6 percent by weight (based on the whole paste) of an ester of an aliphatic, saturated or monounsaturated, linear monocarboxylic acid of ten to twenty carbon atoms and an aliphatic, saturated, branched or linear alcohol of 4 to 30 carbon atoms, or a mixture of such esters, which is present in the paste at 40°C as an emulsified liquid.

A print paste consisting essentially of at least one pigment, binder, thickener and water is to be understood in the present context as containing if desired conventional additives such as dispersing agents, antifoams, catalysts for hardening the binder and the like in addition to the said essential components.

Flat materials include textiles such as woven, nonwoven or knitted fabrics, paper, and real and artificial leather. The material may be of organic or inorganic, natural or synthetic nature provided it has a certain capillarity or porosity. For example textiles and nonwoven materials of natural or regenerated cellulose, wood, polyacrylonitrile, polyesters, polyethylene, glass and also porous film or sheeting, are suitable but not metal foil or extruded or cast plastics film.

The thickening effect is conventionally obtained by emulsifying mineral spirit in water. Using mineral spirit also has the abovementioned advantages as regards brightness and color strength of the prints. It cannot be replaced by a thickener which dissolves in the aqueous phase and imparts thereto a high viscosity. The present invention remedies this situation.

The use of from 1 to 6 percent and preferably from 2 to 5 percent by weight (based on the print paste) of at least one of the esters to be used according to the invention produces the same brightness and color strength as about 10 times this weight of mineral spirit. The esters should be present in the paste as emulsified liquids down to a temperature of 40°C and preferably to 25°C. They are formed from an aliphatic, saturated or monounsaturated, linear monocarboxylic acid of 10 to 20 and preferably of 12 to 18 carbon atoms and an aliphatic, saturated, branched or linear alcohol of 4 to 30 and preferably of 9 to 20 carbon atoms. The lower esters are too volatile and the higher esters are solid at 40°C. Examples of suitable esters are: 2-ethylhexyl stearate, isononyl stearate, isodecyl stearate, a $C_9$ to $C_{11}$ oxoalcohol ester of stearic acid, isodecyl laurate, decyl myristate, decyl palmitate, stearyl caprate and n-butyl stearate.

Suitable esters may be all means by solid at 40°C in the pure form. The technical grade products (which are preferred here) are however not as a rule pure as regards the acid component and the alcohol component, but contain more or less large amounts of other esters. The melting point is thus lowered in a desirable manner. The only criterion for the suitability of an ester is whether it is liquid in the mixture present in the print paste. Whether a given ester or a given mixture of esters is present as a liquid or solid in a given print paste at 40°C depends inter alia on what other additives the color paste contains. In the composition of the print paste specified in Example 1 (in contrast to isodecyl stearate and the stearic ester of $C_{9-11}$ oxoalcohols (technical grade mixture)) the following esters are solid at 40°C in spite of defective purity and are therefore unsuitable in the context of the invention: n-decyl stearate, n-dodecyl stearate and the stearic ester of the $C_{12-15}$ oxoalcohols (technical grade mixture). In print pastes of another composition, the conditions may be different, as already stated.

The production of the print paste and printing with it are done in the conventional ways.

The effect of the esters to be added in accordance with the invention in increasing color yield and brightness is surprising, especially as esters are known as wetting agents and so the converse effect would have been expected since wetting agents promote diffusion of the aqueous phase (which contains the binder and pigment) into the interior of the textile structure by which color yield and brightness are known to be decreased.

The following Examples illustrate the invention. The parts and percentages specified in the Examples are by weight.

EXAMPLE 1

(I).

20 parts of a 30 percent aqueous paste (CI Pigment Red 170); 110 parts of a thickener according to German Pat. No. 1,719,395;

160 parts of a 40 percent aqueous dispersion of a copolymer of 60 percent of n-butyl acrylate,
30 percent of styrene,
6 percent of N-methylolacrylamide and
4 percent of acrylic acid;

3 parts of 25% ammonia solution; and
707 parts of water are mixed together and homogenized by stirring, a print paste being obtained.

(Ia). In a second print paste, prepared in the same way as (I), 50 parts of water is replaced by isodecyl myristate which is emulsified into the paste by high-speed stirring.

A union fabric of 70 percent of polyester and 30 percent of cotton is printing by a conventional method on a conventional roller printing machine with the two print pastes. The prints with paste (Ia) are clearly deeper in color and brighter.

EXAMPLE 2

(I), 70 parts of a thickener according to French Pat. No. 6,917,193 is stirred with 752 parts of water. Then 150 parts of a 40 percent aqueous dispersion of a copolymer of
60 percent of n-butyl acrylate,
20 percent of acrylonitrile,
15 percent of vinyl chloride and
5 percent of N-methylol methacrylamide,
3 parts of 25 percent ammonia solution, and
25 parts of a 30 percent aqueous dye paste (C.I. Vat Violet 9 –C.I. 60,005)
are stirred in and homogeneously dispersed. A print paste is thus obtained.

(Ia). 40 parts of water in a print paste prepared as in (I) is replaced by isononyl stearate which is emulsified into the paste by high speed stirring.

A spun rayon fabric is printed with the two print pastes by a conventional method on a conventional rotary screen printing machine. The prints with paste (Ia) are clearly deeper in color and brighter.

EXAMPLE 3

(I). 100 parts of a thickener according to German Patent 1,719,395 810 parts of water,
10 parts of urea,
70 parts of a 45 percent aqueous dispersion of a copolymer of
60 percent of butadiene,
35 percent of styrene and
5 percent of N-methylol methacrylamide and
10 parts of hexamethylolmelamine hexamethyl ether are brought together in the sequence stated while stirring.

A thickening containing a binder is obtained.

A print paste is prepared from 970 parts of this binder-containing thickening and 30 parts of an about 30 percent phythalocyanine pigment paste.

(Ia). 940 parts of the binder-containing thickening has 30 parts of a C8_11 oxo alcohol ester of stearic acid emulsified into it and then a print paste is prepared therewith as described under (I).

Nylon nonwoven fabric is printed by a conventional method on a flat film printing machine. The prints with the paste (Ia) are clearly deeper in color and brighter.

We claim:

1. In a process for the printing of a flat porous material in bright and deep shades with a print paste containing a pigment dye, the improvement which comprises printing said material with a print paste consisting essentially of at least one pigment dye, a binder, a thickener, water and from 1 to 6 percent by weight, based on the whole paste, of an ester of an aliphatic, saturated or monounsaturated, linear monocarboxylic acid of 10 to 20 carbon atoms and a saturated, branched or linear monohydric alcohol of 4 to 30 carbon atoms or a mixture or such esters which is present in the paste at 40°C as an emulsified liquid.

2. A pigment print past consisting essentially of at least one pigment dye, a binder, a thickener, water and from 1 to 6 percent by weight, based on the whole of the paste, of an ester of an aliphatic, saturated or monounsaturated, linear monocarboxylic acid of 10 to 20 carbon atoms and an aliphatic, saturated, branched or linear monohydric alcohol of 4 to 30 carbon atoms or a mixture of such esters which is present in the paste at 40°C as an emulsified liquid.

3. Textile flat porous material which has been printed with a pigment dye by the process as claimed in claim 1.

4. A process as claimed in claim 1 wherein said ester is selected from the group consisting of 2-ethylhexyl stearate, isononyl stearate, isodecyl stearate, a $C_8$ to $C_{11}$ oxoalcohol ester of stearic acid, isodecyl laurate, decyl myristate, decyl palmitate, stearyl caprate, n-butyl stearate and isodecyl myristate.

5. A print paste as claimed in claim 2 wherein said ester is selected from the group consisting of 2-ethylhexyl stearate, isononyl stearate, isodecyl stearate a $C_8$ to $C_{11}$ oxoalcohol ester of stearic acid, isodecyl laurate, decyl myristate, decyl palmitate, stearyl caprate, n-butyl stearate and isodecyl myristate.

6. A process as claimed in claim 1 wherein the content of said ester in the print paste is 2 to 5 percent by weight.

7. A print paste as claimed in claim 2 wherein the content of said ester in the print paste is 2 to 5 percent by weight.

* * * * *